United States Patent [19]

Chen

[11] Patent Number: 5,007,653
[45] Date of Patent: Apr. 16, 1991

[54] HEAD REST STRUCTURE FOR BABY STROLLERS

[76] Inventor: Kin K. Chen, No. 24, Lane 53, Sec. 3, Anho Rd., Tainan City, Taiwan

[21] Appl. No.: 498,589

[22] Filed: Mar. 26, 1990

[51] Int. Cl.$^5$ .............................................. B62B 9/00
[52] U.S. Cl. ................................ 280/87.051; 297/391
[58] Field of Search ........... 280/47.38, 87.051, 87.021, 280/250.1, 288.4, 304.1, 642, 647, 657, 658; 297/391, 396, 402, 397, 404

[56] References Cited

U.S. PATENT DOCUMENTS 3,680,912  8/1972  Matsuura .............................. 297/391
4,822,030  4/1989  Cone .................................. 280/87.51

Primary Examiner—Andres Kashnikow
Assistant Examiner—Richard Camby

[57] ABSTRACT

An improved head rest assembly cooperates with a seat back and a securing mechanism for baby strollers. The head rest comprises a substantially inverted-U shaped upper part and a base part. The upper part is filled with foam material and then respective rim portions of the upper part and the base part are secured together. The securing mechanism comprises a flat board and several threaded bolts fixedly disposed on the flat board. The flat board is used for sealing the foam material within the upper part against leakage. The threaded bolts are used for screwing the combination of the head rest and the seat back to a frame of the baby stroller.

1 Claim, 3 Drawing Sheets

HEAD REST STRUCTURE FOR BABY STROLLERS

BACKGROUND OF THE INVENTION

The present invention relates generally to baby strollers. More particularly, the present invention relates to an improved cushioned head rest structure used in baby strollers of the type comprising a rest back for carrying a baby and securing means for mounting to a frame of the baby stroller.

Baby strollers utilizing conventional cushioned head rest and related components are shown in FIGS. 3 and 3-1. It can be seen from FIG. 3-1 that the baby stroller substantially comprises a cushioned head rest (A), a seat back (E), and a securing means (D). The head rest (A) is filled with foam material, represented by the character B, and enclosed by soft material identified by the character C. The enclosing material (C) has two free end portions both secured to the securing means (D) at the far end from the seat back (E). Accordingly, the seat back (E) is secured, for example by screws, to the other end of the securing means (D). The securing means (D) can then be secured to a frame of the baby stroller.

The above type of cushioned head rests for baby strollers have the drawback of being easily bent about the junction portion between the head rest and the securing means by external forces (such as the backward movement of the baby, particularly its head) such that the baby might be inadvertently injured, It is the purpose of this present invention, therefore, to mitigate and/or obviate the abovementioned drawback in the manner set forth in the detailed description of the preferred embodiment.

SUMMARY OF THE INVENTION

It is a primary objective of the present invention to provide an improved cushioned head rest for baby stroller which is firm and secure.

Further objectives and advantages of the present invention will become apparent as the following description proceeds, and the features of novelty which characterize the invention will be pointed out with particularity in the claims annexed to and forming a part of this invention.

BRIEF DESCRIPTION OF THE DRAWINGS

FIG. 2-1 is a side elevational view of FIG. 2 showing the cushioned head rest in more detail; and FIGS. 3 and 3-1 are similar views to FIGS. 2 and 2-1, respectively, but showing the prior art cushioned head rest construction.

DETAILED DESCRIPTION OF THE PREFERRED EMBODIMENT

Figure 1:
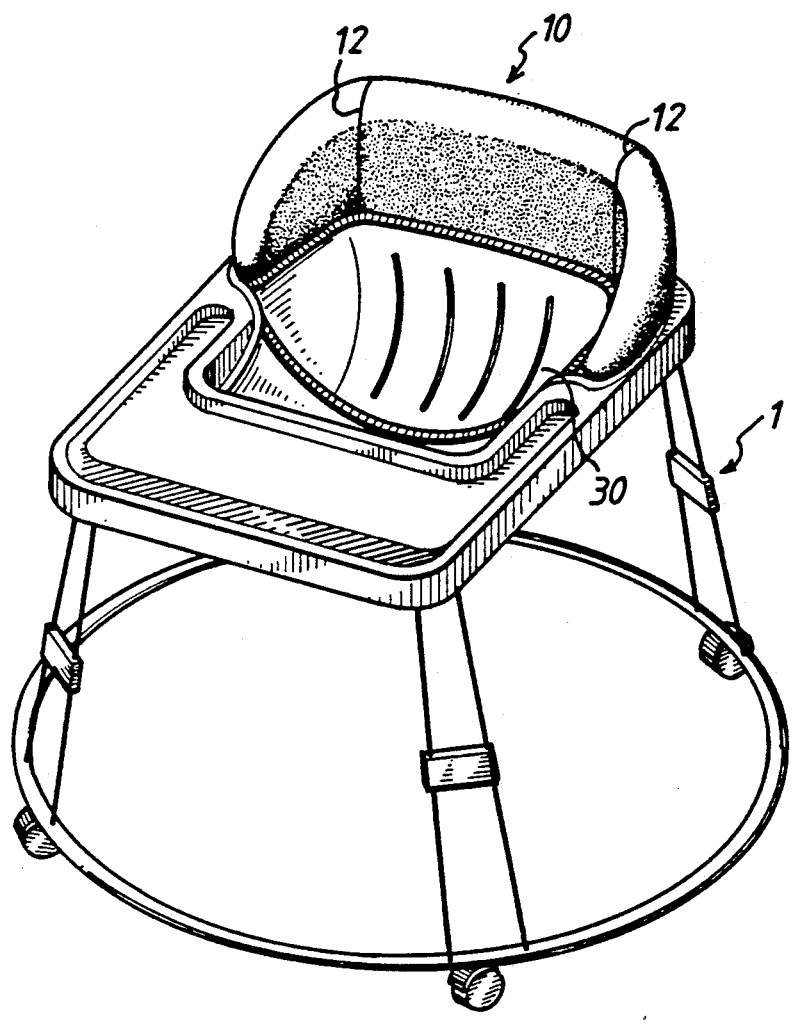
FIG. 1 is a perspective view showing a baby stroller incorporating the cushioned head rest in accordance with the present invention.
Figure 2:
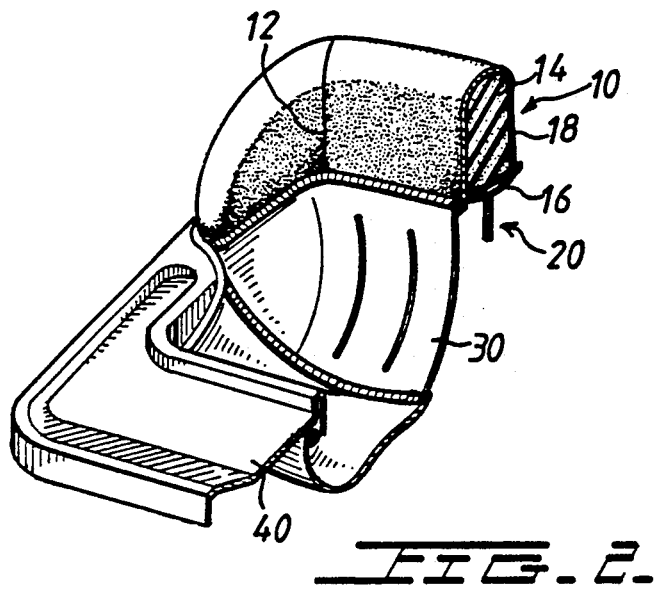
FIG. 2 is a perspective cut-away view of the baby stroller in FIG. 1 showing the construction of the cushioned head rest, with the frame of the baby stroller removed for simplicity.
Figures 1, 2:
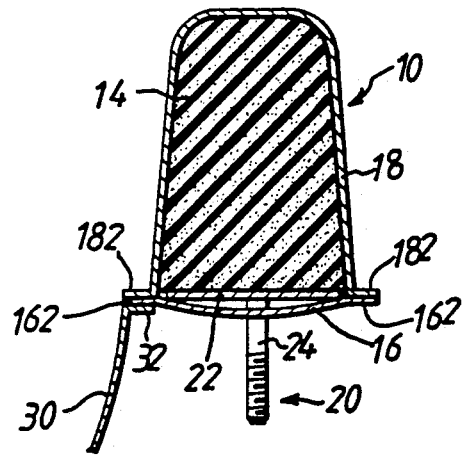
Figure 3:
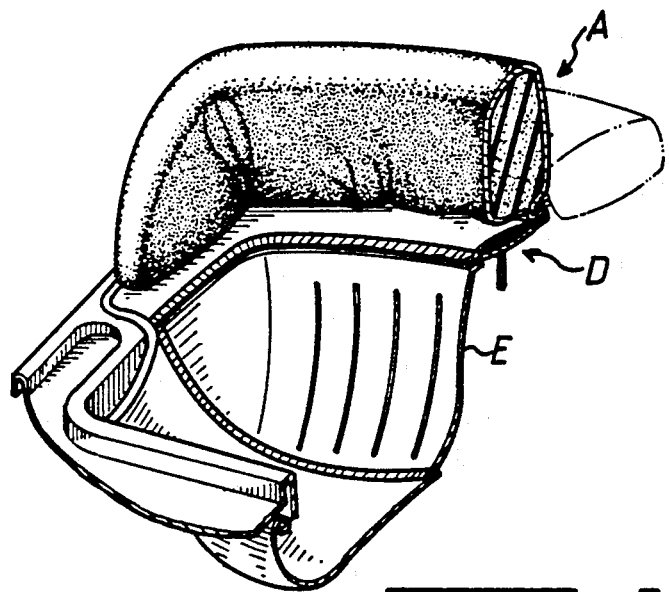
Figures 1, 3:
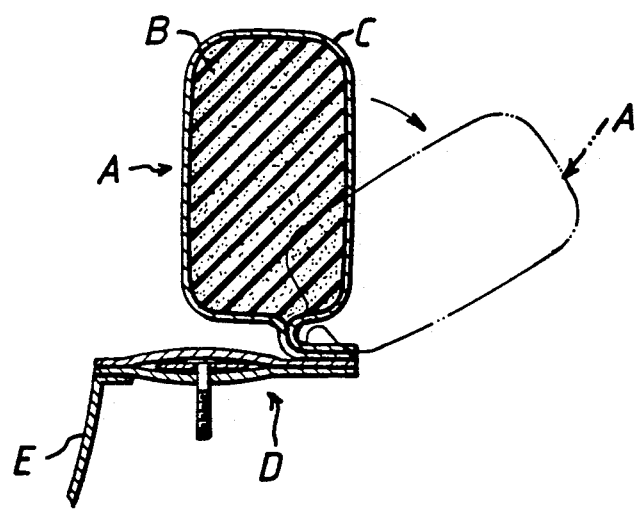

Referring now to the drawings, and more particularly to FIGS. 1 to 3, there is shown the baby stroller, designated generally by reference numeral 1, which incorporates the preferred embodiment of the present invention. The baby stroller shown is of the type having a cushioned head rest 10 filled with foam material 14, a seat back 30 for carrying or receiving babies, and a securing means 20 for supporting and mounting the combination of the seat back 30 and the cushioned head rest 10 on a frame 40 of the baby stroller 1. Although the baby stroller 1 shown in FIG. 1 illustrates specific conventional elements, it is within the scope of the invention in practical application to adapt the disclosed cushioned head rest 10 to other available components built on known type baby strollers.

As shown in FIGS. 1 and 2, the cushioned head rest 10 of the present invention exhibits corner sections which are smoothly shaped as shown by connection lines 12. This feature was not attainable in prior art head rest structure.

Referring now to FIG. 2-1, the cushioned head rest 10 comprises a base part 16 and an upper part 18. The upper part 18 has substantially an inverted-U shaped cross-section and two rim portions 182 each to be fixedly secured to one of two free end portions 162 of the base part 16, respectively. The seat back 30 is shaped appropriately and comprises at least a rim portion 32. As can be seen in FIG. 2-1, the seat back 30 is secured to one of the pair of fixedly secured portions 162, 182 of the cushioned head rest 10 by the rim portion 32. The securing means 30 comprises a flat board 22 designed to substantially cover the opening of the inverted-U shaped upper part 18 of the head rest 10 which is thereafter filled with foam material 14. The securing means 30 also comprises a plurality of threaded bolts 24 fixedly disposed on the flat board 22 for fixably securing the combination of the cushioned head rest 10 and the seat back 30 to the frame 40 of the baby stroller 1, as described above.

As shown in FIGS. 2 and 2-1, the securing means 20 is disposed directly under the foam material and within the cushioned head rest 10 for sealing the foam material against leakage. The securing means 20 comprises the threaded bolt 24 which passes through the base part 16 of the head rest 10 and can be screwed to the frame 40 of the baby stroller 1.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claim.

I claim:

1. In baby strollers of the type having a cushioned head rest filled with foam material, a seat back, and securing means for supporting and mounting the combination of the seat back and the cushioned head rest on a frame of the baby stroller, wherein the improvements comprise:

said cushioned head rest comprising a base part and an upper part, said upper part having substantially an inverted U-shaped cross-section providing a cavity and having a pair of side surfaces extending along said foam material which is received within said cavity and outwardly extending rim portions at the base of said side surfaces, and base part extending below and across said upper part and said rim portions being fixedly secured to the underlying portions of said base part, said seat back being secured to one of said fixedly secured rim and base portions of said cushioned head rest; and said securing means being disposed in said cavity directly under said foam material within said cushioned head rest and said base part sealing the cavity and thereby said foam material against leakage thereunto, said securing means extending through said base part and comprising a threaded fastener for engagement with the frame of the baby stroller.

* * * * *